US007627949B2

(12) United States Patent
Takegawa et al.

(10) Patent No.: US 7,627,949 B2
(45) Date of Patent: Dec. 8, 2009

(54) MOTORCYCLE ENGINE

(75) Inventors: Go Takegawa, Tondabayashi (JP); Masahide Saito, Tondabayashi (JP)

(73) Assignee: Special Parts Takegawa Co., Ltd., Osaka (JP)

( * ) Notice: Subject to any disclaimer, the term of this patent is extended or adjusted under 35 U.S.C. 154(b) by 0 days.

(21) Appl. No.: 11/524,248

(22) Filed: Sep. 21, 2006

(65) Prior Publication Data

US 2008/0028603 A1 Feb. 7, 2008

(30) Foreign Application Priority Data

Jul. 20, 2006 (JP) ............................ 2006-198084

(51) Int. Cl.
*B23P 6/00* (2006.01)
*F02F 3/00* (2006.01)

(52) U.S. Cl. ........................... 29/888.011; 29/888.041; 29/401.1; 29/402.09; 29/402.08

(58) Field of Classification Search ............. 29/888.01, 29/888.011, 888.041, 401.1, 402.08; 180/89.2, 180/266, 291, 229; 123/169; 280/124.01; 118/317

See application file for complete search history.

(56) References Cited

U.S. PATENT DOCUMENTS

| | | | | |
|---|---|---|---|---|
| 4,980,996 | A * | 1/1991 | Klink et al. | 451/51 |
| 5,183,025 | A * | 2/1993 | Jorstad et al. | 123/669 |
| 5,241,747 | A * | 9/1993 | Harmand | 29/888.42 |
| 5,341,781 | A * | 8/1994 | Gerhardt | 123/195 R |
| 5,584,269 | A * | 12/1996 | MacKenzie | 123/142.5 R |
| 5,662,082 | A * | 9/1997 | Black et al. | 123/254 |
| 5,666,725 | A * | 9/1997 | Ward | 29/888.011 |
| 6,026,568 | A * | 2/2000 | Atmur et al. | 29/888.06 |
| 6,029,346 | A * | 2/2000 | Chellappa | 29/888.04 |
| 6,324,744 | B1 * | 12/2001 | Banks et al. | 29/525.13 |
| 6,735,863 | B1 * | 5/2004 | Hayman | 29/888.06 |
| 6,973,906 | B2 * | 12/2005 | Yoshida et al. | 123/182.1 |

(Continued)

FOREIGN PATENT DOCUMENTS

| | | |
|---|---|---|
| JP | 8-338345 | 12/1996 |

(Continued)

OTHER PUBLICATIONS

Japanese Notice of Grounds for Rejection for JP-2006-198084 mailed May 20, 2008 and its English Translation.

*Primary Examiner*—Essama Omgba
(74) *Attorney, Agent, or Firm*—Wenderoth, Lind & Ponack, L.L.P.

(57) ABSTRACT

In order to increase the displacement of a motorcycle engine, the existing cylinder block of the engine is dismounted from its crankcase, and the existing piston is dismounted from its connecting rod. Then, a new piston having a greater diameter than the dismounted existing piston is mounted on the connecting rod, and a new cylinder block having a greater bore diameter than the existing dismounted cylinder block is connected to the crankcase while sliding the new large-diameter piston along the inner wall of the bore of the new cylinder block. The new cylinder block has a bottom end that is located above the top end of the crankcase when mounted on the crankcase. The new piston is short enough not to be inserted into the crankcase when moved to the bottom dead center. This eliminates the need to disassemble the crankcase or any parts in the crankcase. It is thus possible to easily increase the engine displacement.

11 Claims, 6 Drawing Sheets

U.S. PATENT DOCUMENTS

| | | | | |
|---|---|---|---|---|
| 7,080,628 | B2 * | 7/2006 | Kado et al. | 123/399 |
| 7,089,662 | B2 * | 8/2006 | Izquierdo et al. | 29/888.061 |
| 7,146,724 | B2 * | 12/2006 | Millerman | 29/888.01 |
| 7,351,042 | B2 * | 4/2008 | Jinnai et al. | 417/407 |

FOREIGN PATENT DOCUMENTS

| | | |
|---|---|---|
| JP | 08-338345 | 12/1996 |

* cited by examiner

MOTORCYCLE ENGINE

BACKGROUND OF THE INVENTION

This invention relates to a method of increasing the displacement of a motorcycle engine by increasing the bore diameter of its cylinder block and the diameter of its piston, and a piston and a cylinder block used in the engine of which the displacement has been increased according to the method of the present invention.

Ordinarily, to increase the displacement of a motorcycle engine, its piston is replaced with one having a larger diameter, and its cylinder block is replaced with one having a greater bore diameter or is dismounted from the engine and its bore diameter is increased by boring so that the piston with a larger diameter can be received therein.

As shown in FIGS. 3A and 3B, the cylinder bore 12 extends through the cylinder block 2 from its end facing a crankcase 1 to its end facing a cylinder head 7. The cylinder block 2 has its bottom end 2*a* inserted in and fixed to the crankcase 1.

A cylinder sleeve may be pressed in the cylinder bore 12 to extend into the crankcase 1.

The piston 10 has at its lower portion a lateral boss 10*b*, and is connected to the top of a connecting rod 4 by means of a piston pin 15 inserted through the boss 10*b* and a pin hole 4*a* (see FIG. 2, which itself represents an embodiment of the present invention) formed in the top end of connecting rod 4 so as to align with the boss 10*b*.

The connecting rod 4 is connected at its bottom end to a crank pin 17 of a crankshaft 3 so that the piston 10 reciprocates between a top dead center U shown by phantom line in FIGS. 3A and 3B and a bottom dead center D shown by solid line in FIGS. 3A and 3B.

In order to increase the engine displacement, the piston is replaced with one with a larger diameter, and the cylinder block is replaced with one having a greater cylinder bore diameter or its bore diameter is increased by boring so as to correspond to the piston with an increased diameter. In this arrangement, because the bottom end of the piston 10 is adapted to be inserted into the crankcase 1 and the bottom end 2*a* of the cylinder block 2 is inserted in the crankcase 1, as shown in FIG. 5, corresponding to the piston with an increased diameter the diameter of the top opening 1*a* of the crankcase 1 has to be increased from A to B in FIGS. 4A to 4C.

Thus, it is extremely troublesome and time-consuming and costly to increase the displacement of an engine by increasing the piston diameter and the cylinder bore diameter, because most of the parts of the engine, including the piston 10, cylinder sleeve, connecting rod 4 and crankshaft 3, have to be disassembled.

SUMMARY OF THE INVENTION

An object of the invention is therefore to provide a method by which the piston diameter and the cylinder bore diameter can be more easily increased.

According to the present invention, in order to increase the displacement of the engine, the existing piston is replaced with a new piston having a greater diameter than the existing piston but having a smaller height than the existing piston, so that the new piston is not inserted into the crankcase. The existing cylinder block is replaced with a new cylinder piston having a greater bore diameter and sized so as not to be inserted into the crankcase when mounted on the crankcase.

With this arrangement, by replacing or working only members located above the crankcase, the engine displacement can be increased. This eliminates the need to e.g. disassemble any parts in the crankcase to increase the engine displacement.

Also, because there is no need to increase the diameter of the top opening of the crankcase corresponding to the large-diameter piston, the crankcase maintains high strength.

Specifically, according to the present invention, there is provided a method for increasing the displacement of a motor cycle engine comprising a crankcase, a crankshaft rotatably mounted in the crankcase, a first cylinder block connected to the crank case and defining a first cylinder bore extending therethrough from one end thereof facing a cylinder head to another end thereof facing the crankcase, and a first piston disposed in the cylinder bore and connected to the crankshaft through a connecting rod, the first piston being configured to reciprocate between a top dead center and a bottom dead center; the method comprising dismounting the first cylinder block from the crankcase, dismounting the first piston from the connecting rod, mounting a second piston having a greater diameter than the first piston to the connecting rod, and mounting a second cylinder block defining a second cylinder bore having a greater diameter than the first cylinder bore on the crankcase, with the second piston received in the second cylinder bore, the second cylinder block having a bottom end which is located above a top end of the crankcase with the second cylinder block mounted on the crankcase, the second piston being configured to reciprocate between the top dead center and bottom dead center and having a bottom end located above the top end of the crankcase when the second piston is at the bottom dead center.

Thus, it is possible to increase the engine displacement by removing the cylinder head and replacing only members located above the crankcase, i.e. the cylinder block, the piston and their attachments with new ones. There is no need to disassemble the crankcase or any parts in the crankcase.

The second cylinder block may be prepared by increasing the bore diameter of the first cylinder block by boring, or may be a different member from the first cylinder block.

The present invention also provides a piston used in the above-described method of the present invention, the piston having a bottom end which is located higher than the top end of the crankcase when the piston is at the bottom dead center.

There is also provided a cylinder block used in the method of the present invention, the cylinder block having a bottom end which is located higher than the top end of the crankcase when the cylinder block is mounted on the crankcase.

According to the present invention, because it is not necessary to disassemble the crankcase or any parts in the crankcase to increase the engine displacement, the engine displacement can be easily increased. Also, because the second piston is not inserted into the crankcase, there is no need to increase the diameter of the top opening of the crankcase corresponding to the large-diameter piston. The crankcase thus maintains high strength.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
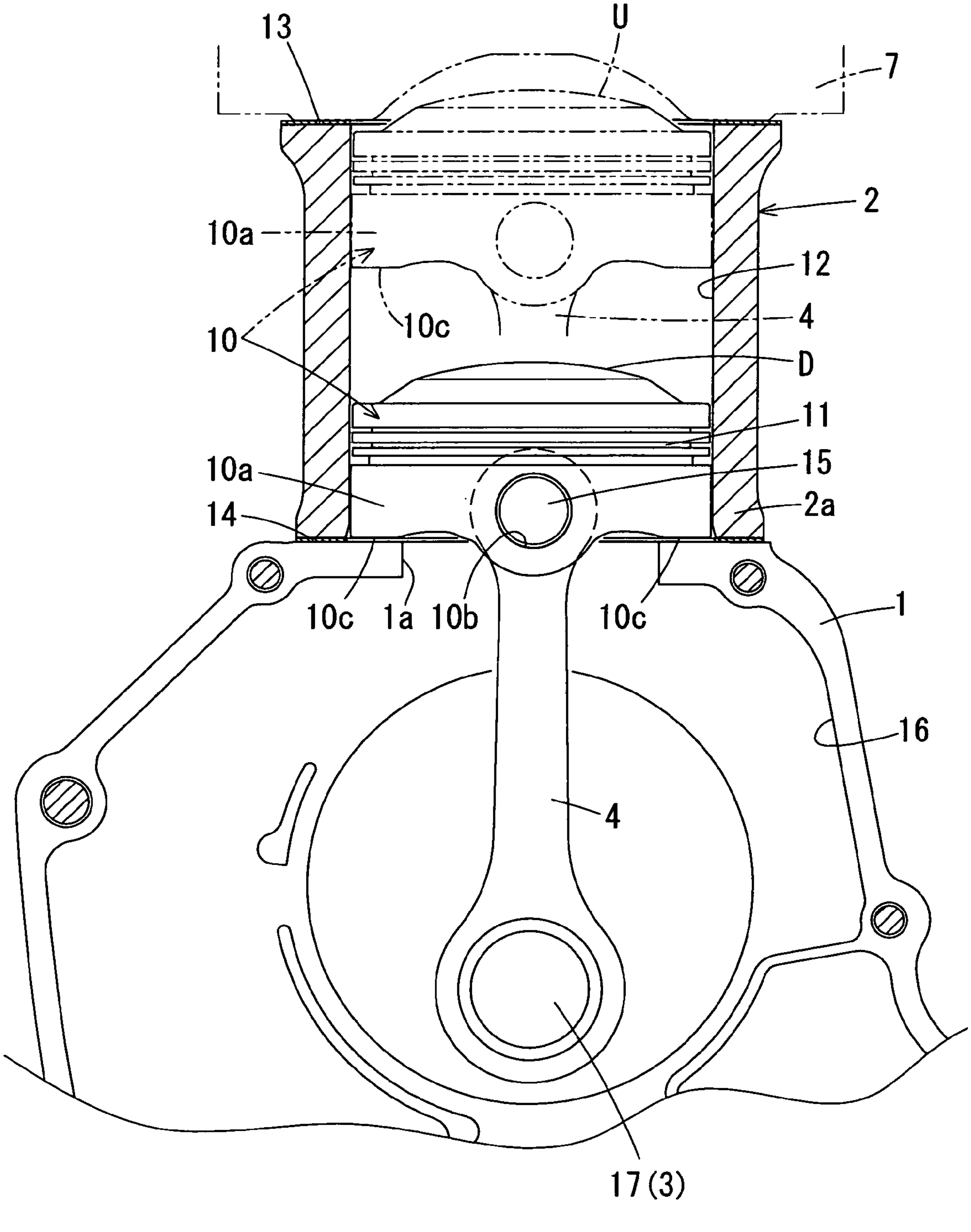
FIG. 1 is a front view of an embodiment of the present invention.
Figure 2:
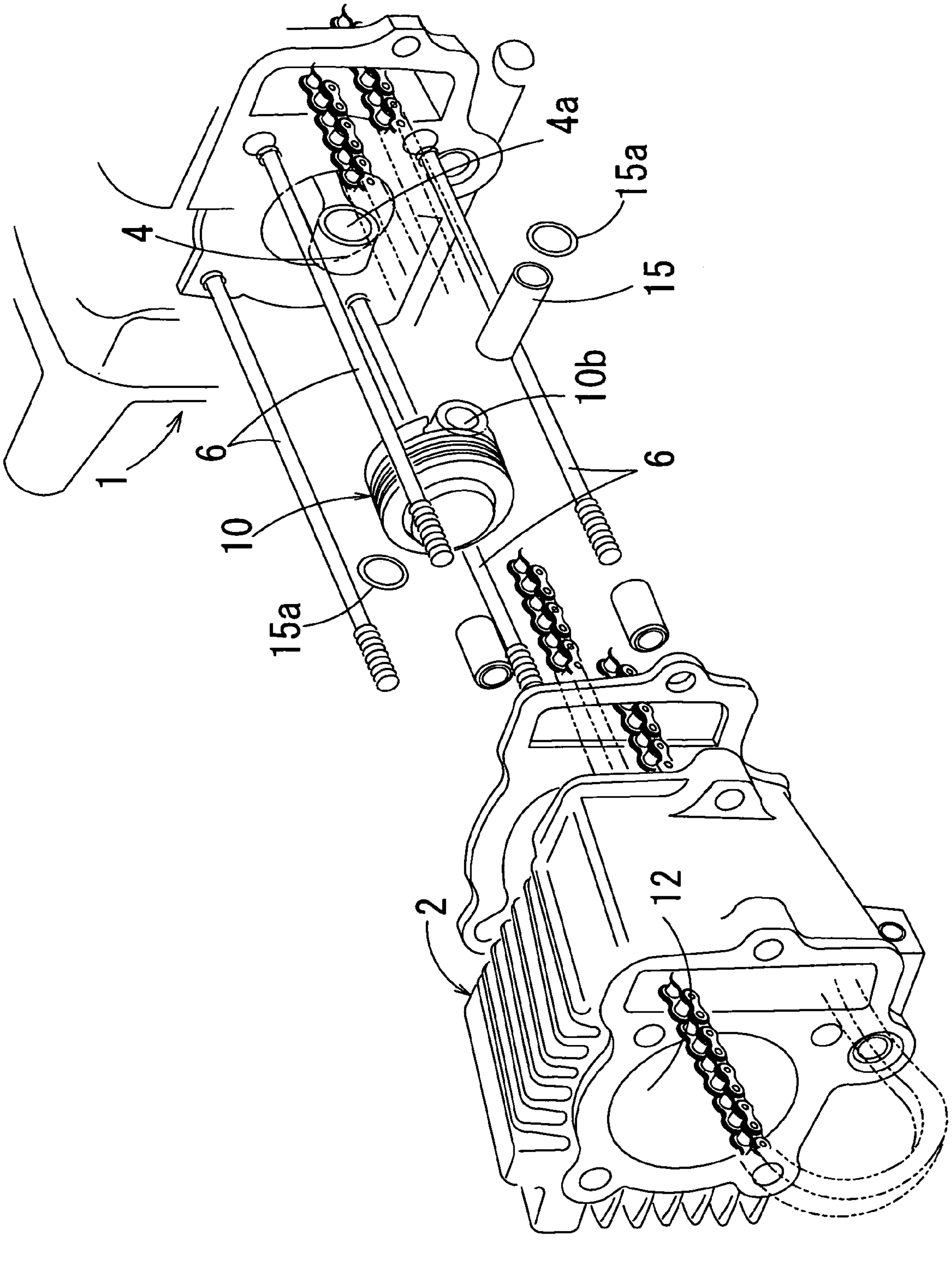
FIG. 2 is a partial exploded perspective view of the embodiment of FIG. 1.
Figure 3A:
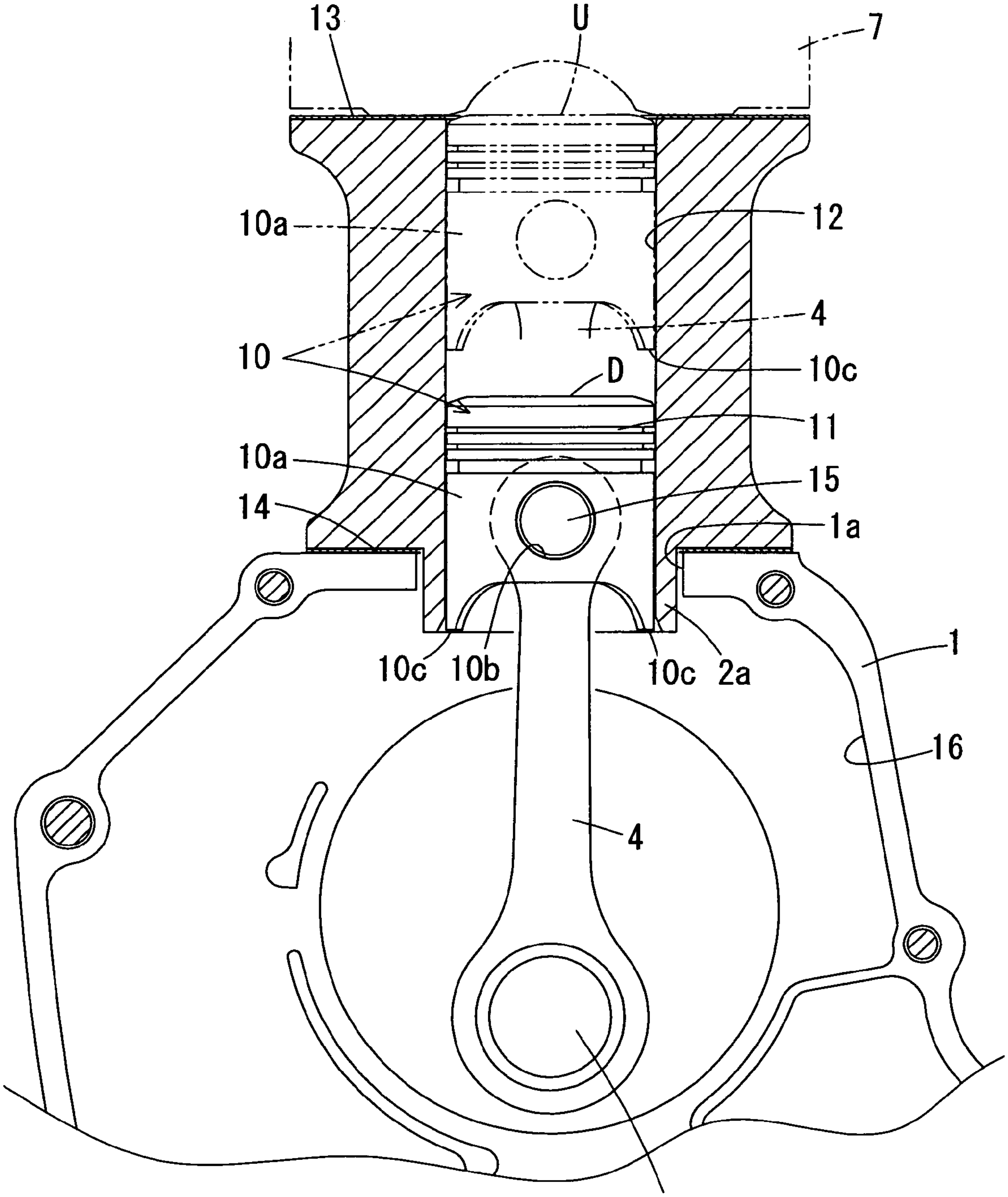
FIG. 3A is a front view of an existing engine.
Figure 3B:
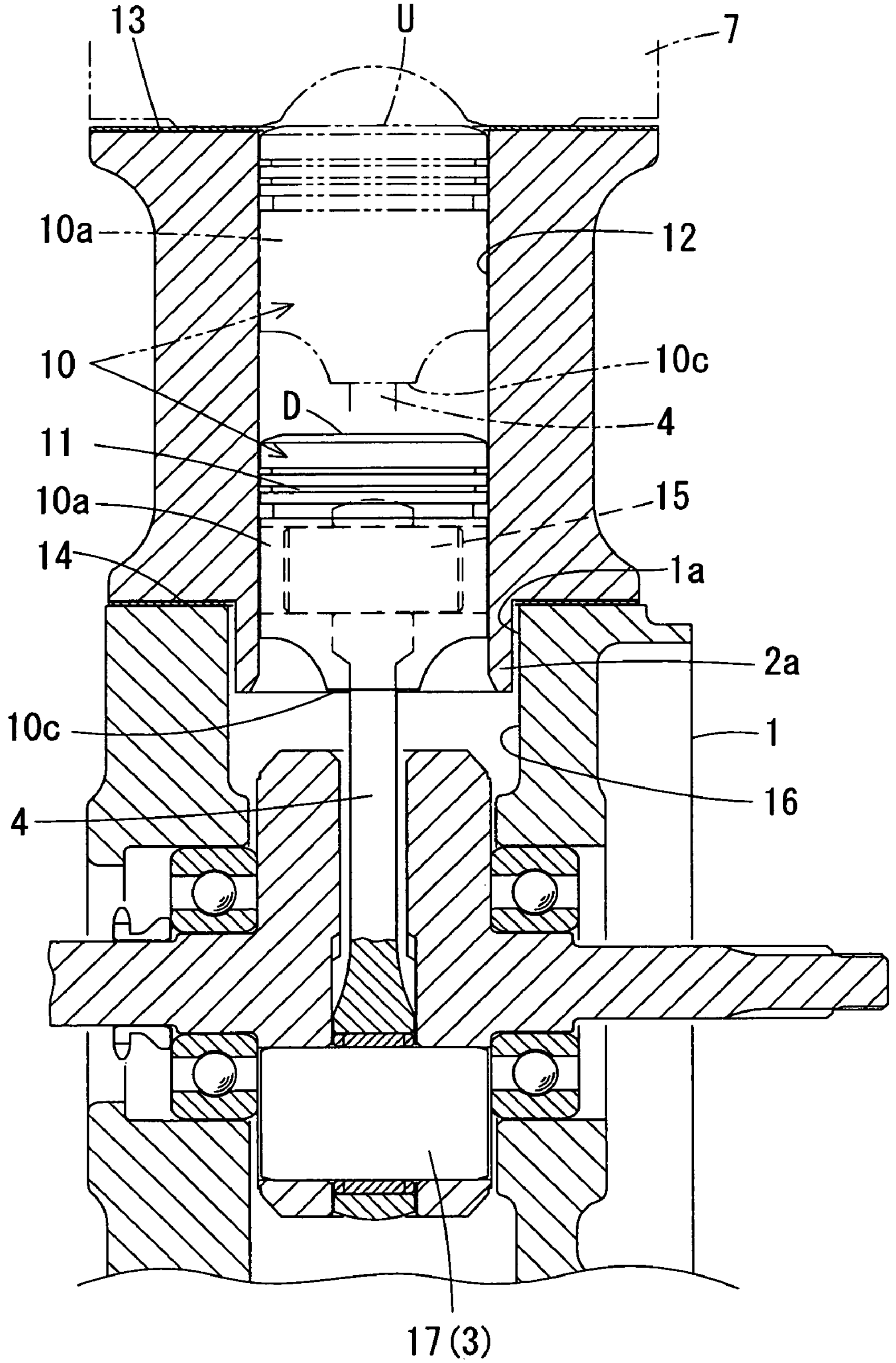
FIG. 3B is a side view thereof.
Figure 4A:
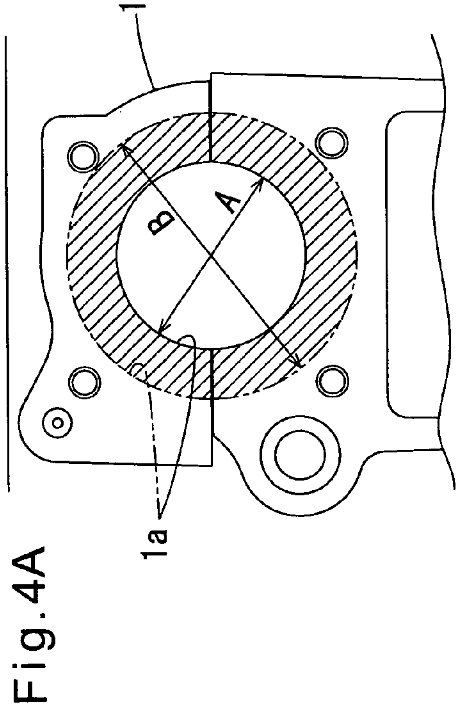
FIGS. 4A to 4C are a plan view, front view and side view of a crankcase, respectively.
Figure 4B:
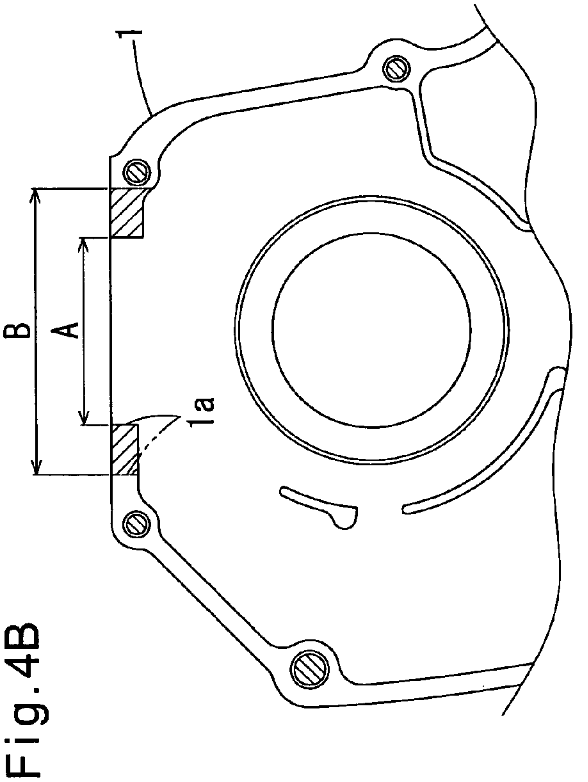
Figure 4C:
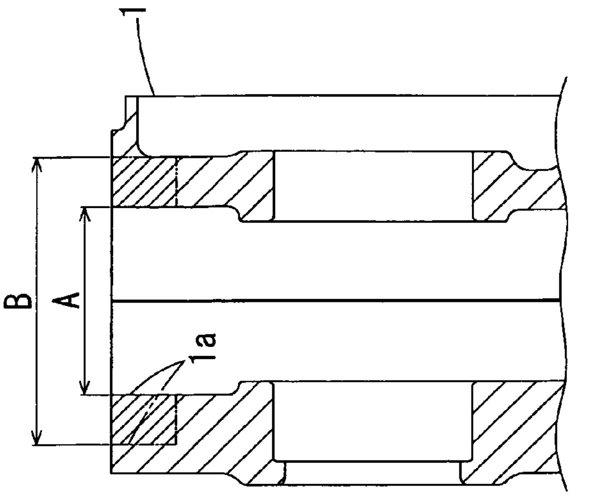
Figure 5:
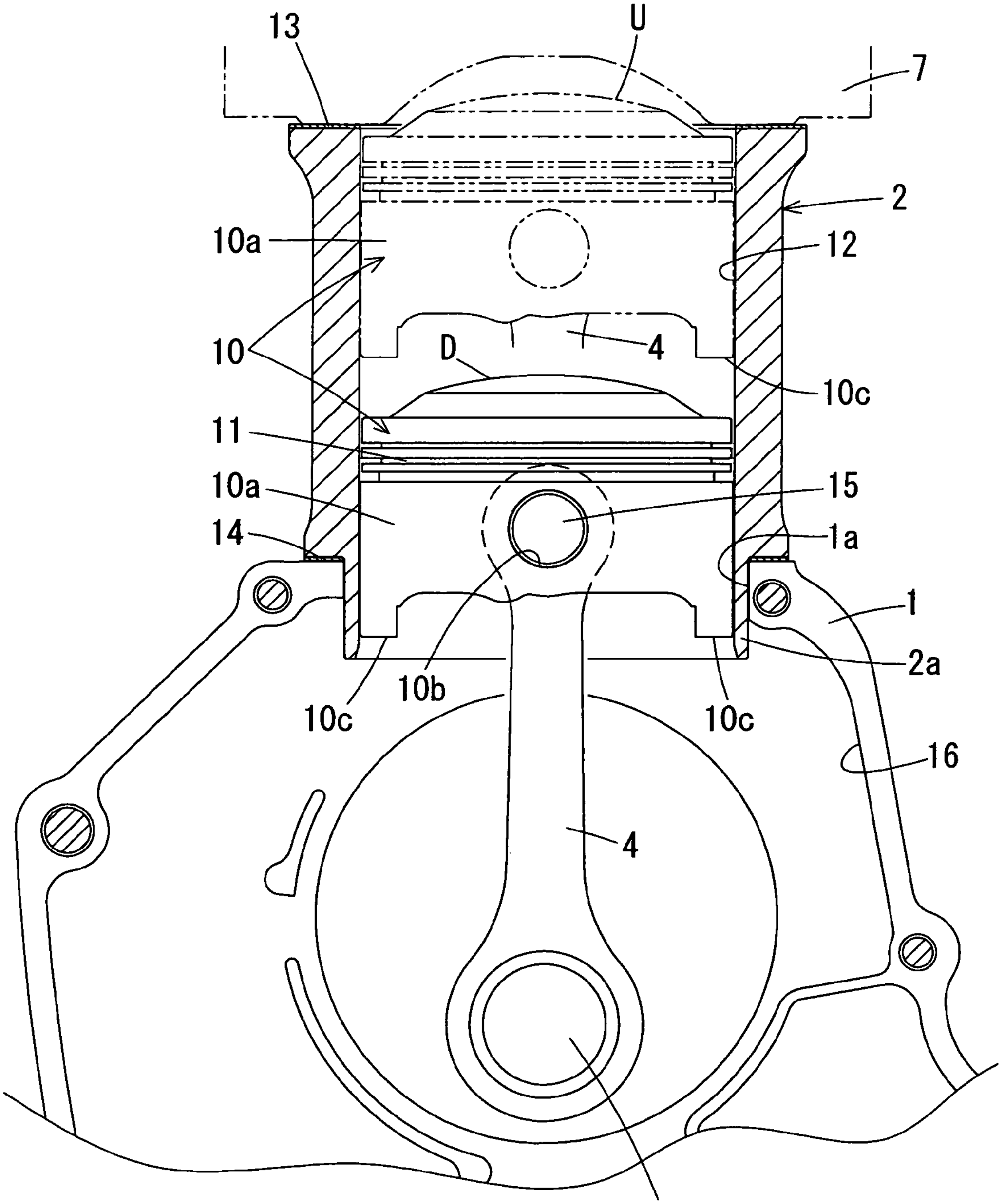
Fig.5 Prior Art
FIG. 5 is a front view of the prior art.

The embodiment is now described with reference to the drawings. This embodiment is directed to a method of increasing the displacement of a C50E type air-cooled 4-cycle single-cylinder 50 cc engine mounted on a "Super-cub" (trade name) made by Honda Motor Co., Ltd. to 95 cc or 106 cc by increasing the bore diameter of its cylinder block. FIGS. 3A and 3B show the engine before the cylinder bore diameter has been increased. FIG. 1 shows the engine after the cylinder bore diameter has been increased. FIG. 2 is an exploded view of the engine after the cylinder bore diameter has been increased.

The method of the present invention is applicable not only to the abovementioned specific engine but to various other types of engines having different displacements.

As shown in FIGS. 3A and 3B, the crankcase 1 defines a crank chamber 16 in which the crankshaft 3 is rotatably mounted. The crankcase 1, cylinder block 2 and cylinder head 7 are joined together by means of a plurality of stud bolts 6 through gaskets 13 and 14.

But the crankcase 1, cylinder block 2 and cylinder head 7 may be joined together by any other known means.

The piston 10 reciprocates between the top dead center U and the bottom dead center D by combusting air-fuel mixture introduced into the combustion chamber, thereby imparting torque to the crankshaft 3 through the connecting rod 4.

Now the method for increasing the engine displacement according to the present invention is described.

First, the stud bolts 6 are loosened and removed. The cylinder head 7 is then dismounted from the cylinder block 2, and the cylinder block 2 is dismounted from the crankcase 1. Since the piston 10 is connected to the connecting rod 4, the cylinder block 2 is dismounted from the crankcase 1 while sliding the piston 10 along the inner wall of the cylinder bore 12.

Then, a circlip 15*a* keeping the piston pin 15 in position is removed, and the piston pin 15 is pulled out to disconnect the piston 10 from the connecting rod 4.

A new cylinder block 2 having a bore 12 that is larger in diameter than the bore of the removed cylinder block 2 is prepared. Also, a new piston 10 having a piston ring 11 with a diameter corresponding to the bore 12 of the new cylinder block 2 is prepared.

As shown in FIG. 1, the new cylinder block 2 has a bottom end 2*a* which is configured to rest on the edge of the top opening 1*a* of the crankcase 1 without being inserted into the top opening 1*a*.

With the top end of the connecting rod 4 protruding from the top opening 1*a* of the crankcase 1, the new large-diameter piston 10 is connected to the top end of the connecting rod 4 by means of the piston pin 15 (see FIG. 2). The new cylinder block 2 is then placed on the crankcase 1 with the gasket 14 disposed therebetween, while sliding the piston 10 along the inner wall of the cylinder bore 12. As shown in FIG. 1, the new large-diameter piston 10 has a shorter skirt 10*a* than the removed piston 10 shown in FIGS. 3A and 3B.

Finally, the cylinder head 7 is placed on the cylinder block 2 through the gasket 13, and the crankcase 1, cylinder block 2 and cylinder head 7 are joined together by the stud bolts 6.

In this arrangement, with the piston 10 at the bottom dead center D, the bottom end 10*c* of the skirt 10*a* of the piston 10 remains in the cylinder block 2 while not protruding into the crankcase 1. Thus, it is not necessary to increase the diameter of the top opening 1*a* of the crankcase 1 by boring.

According to the above-described method of the present invention, the engine displacement can be increased simply by replacing the existing cylinder block (first cylinder block) 2 with one (second cylinder block) having a larger bore diameter or increasing the bore diameter of the existing cylinder block 2, and replacing the existing piston 10 with a new large-diameter piston 10, without the need to dismount the entire engine from the motorcycle.

In the embodiment, in order to increase the engine displacement, the existing cylinder block 2 is replaced with the new cylinder block 2 having an increased bore diameter. But instead, the diameter of the bore 12 of the existing cylinder block (first cylinder block) 2 may be increased so as to correspond to the new large-diameter piston 10 by boring after dismounting it (to form a second cylinder block), if the existing cylinder block 2 has a sufficiently thick peripheral wall and if the cylinder block 2 maintains sufficient strength after boring.

In this case, when the bore diameter of the existing cylinder block 2 is increased by boring, its bottom end 2*a*, which is inserted in the crankcase 1, is removed simultaneously. Thus, after boring, the bottom end 2*a* of the cylinder case 2 is not inserted in the crankcase 1. This eliminates the need to increase the diameter of the top opening of the crankcase 1 as in the embodiment.

The method of the present invention is applicable not only to the above-described particular motorcycle engine but to other engines. That is, the method of the present invention is equally applicable to both 2-cycle and 4-cycle engines, both single-cylinder and multiple-cylinder engines, and engines with different valve structures.

What is claimed is:

1. A method for increasing a displacement of a motor cycle engine comprising a crankcase, a crankshaft rotatably mounted in the crankcase, a first cylinder block connected to the crankcase and defining a first cylinder bore extending therethrough from one end thereof facing a cylinder head to another end thereof facing the crankcase, and a first piston disposed in the cylinder bore and connected to the crankshaft through a connecting rod, the first piston being configured to reciprocate between a top dead center and a bottom dead center, and the first cylinder block having a bottom end received in the crankcase such that the bottom end of the first cylinder block is located below a top end of the crankcase when the first cylinder block is mounted on the crankcase, said method comprising:

dismounting the first cylinder block from the crankcase, including removing the bottom end of the first cylinder block from its location in the crankcase;

dismounting the first piston from the connecting rod;

mounting a second piston having a greater diameter than the first piston to the connecting rod; and mounting a second cylinder block defining a second cylinder bore having a greater diameter than the first cylinder bore on the crankcase, with the second piston received in the second cylinder bore, said second cylinder block having a bottom end which is located above a top end of the crankcase with the second cylinder block mounted on the crankcase, said second piston being configured to reciprocate between said top dead center and bottom dead center and having a bottom end located above the top end of the crankcase when the second piston is at the bottom dead center.

2. A method according to claim 1, wherein the bottom end of the cylinder block comprises a cylinder block extension part having a part of the cylinder bore defined therein;

the crankcase has an opening formed therein;

when the first cylinder block is connected to the crankcase, the cylinder block extension part extends into the crankcase through the opening formed therein; and in said dismounting of the first cylinder block from the crankcase, the cylinder block extension part is removed from the crankcase through the opening formed therein.

3. A method according to claim 2, wherein in said mounting of the second cylinder block on the crankcase, the second cylinder block is mounted so that the second cylinder bore aligns with the opening formed in the crankcase, and a bottom-most end of the second cylinder block is supported on the crankcase and disposed outwardly of the opening formed in the crankcase.

4. A method according to claim 1, wherein said second piston is shorter in an axial direction than said first piston such that said bottom end of said second piston does not protrude into said crankcase when said second piston is at the bottom dead center.

5. A method according to claim 1, wherein a length of said second piston in a direction of reciprocation is shorter than a length of said first piston in the direction of reciprocation.

6. A method according to claim 5, wherein the first piston has a first skirt portion on a bottom side thereof, and wherein said second piston has a second skirt portion at said bottom end of said second piston, the second skirt portion of said second piston being shorter than the first skirt portion of the first piston such that said bottom end of said second piston does not protrude into the crankcase when said second piston is at the bottom dead center.

7. A method according to claim 5, wherein the crankcase has a top opening through which the connecting rod extends, the top opening being smaller than the second cylinder bore such that said crankcase extends beyond said second cylinder block toward the connecting rod.

8. A method according to claim 5, wherein the crankcase has a top opening through which the connecting rod extends, the top opening being smaller than the diameter of the second piston such that said bottom end of said second piston cannot protrude into the crankcase.

9. A method according to claim 1, wherein the first piston has a first skirt portion on a bottom side thereof, and wherein said second piston has a second skirt portion at said bottom end of said second piston, the second skirt portion of said second piston being shorter than the first skirt portion of the first piston such that said bottom end of said second piston does not protrude into the crankcase when said second piston is at the bottom dead center.

10. A method according to claim 1, wherein the crankcase has a top opening through which the connecting rod extends, the top opening being smaller than the second cylinder bore such that said crankcase extends beyond said second cylinder block toward the connecting rod.

11. A method according to claim 1, wherein the crankcase has a top opening through which the connecting rod extends, the top opening being smaller than the diameter of the second piston such that said bottom end of said second piston cannot protrude into the crankcase.

* * * * *